(12) United States Patent
Sterner et al.

(10) Patent No.: US 6,977,054 B1
(45) Date of Patent: Dec. 20, 2005

(54) METHOD FOR PRODUCING A PLASTIC FILM HAVING IMPROVED CHARACTERISTICS, APPARATUS FOR PERFORMING THE METHOD, AND FILM THUS OBTAINED

(75) Inventors: Marion Sterner, Venice (IT); Giorgio Trani, Venice (IT); Sergio Visona', Chiuppano (IT); Marco Razeti, Padua (IT)

(73) Assignee: BP Europack, S.p.A., (IT)

( * ) Notice: Subject to any disclaimer, the term of this patent is extended or adjusted under 35 U.S.C. 154(b) by 281 days.

(21) Appl. No.: 09/578,236

(22) Filed: May 24, 2000

(30) Foreign Application Priority Data

May 25, 1999 (IT) .............................. PD99A0114

(51) Int. Cl.[7] .............................................. B29C 71/00
(52) U.S. Cl. ...................................... 264/131; 264/349
(58) Field of Search ............................... 264/131, 130, 264/129, 171.26, 211.12, 211.13, 171.28, 264/211, 349; 427/401

(56) References Cited

U.S. PATENT DOCUMENTS

| | | |
|---|---|---|
| 2,641,022 A | 6/1953 | Kress |
| 2,668,323 A | 2/1954 | Johnson |
| 3,065,097 A | 11/1962 | Zupic |
| 3,068,516 A | 12/1962 | Hofer |
| 3,157,560 A | 11/1964 | Livingstone et al. |
| 3,451,884 A | 6/1969 | Hachiya |
| 3,576,658 A | 4/1971 | Notomi et al. |
| 3,709,642 A | 1/1973 | Stannard |
| 3,765,922 A | 10/1973 | Chisholm |
| 3,822,333 A | 7/1974 | Haruta et al. |
| 4,659,532 A | 4/1987 | Wolfgang |
| 4,814,207 A * | 3/1989 | Siol et al. ................. 427/393.5 |
| 5,505,601 A | 4/1996 | Sensen et al. |
| 6,024,824 A * | 2/2000 | Krech .......................... 264/131 |

FOREIGN PATENT DOCUMENTS

| | | |
|---|---|---|
| EP | 0 071 349 | 2/1983 |
| EP | 0 221 690 | 5/1987 |
| EP | 0 245 728 | 11/1987 |
| EP | 0 369 780 | 5/1990 |
| EP | 0 457 926 | 11/1991 |
| EP | 0 839 855 | 5/1998 |

* cited by examiner

*Primary Examiner*—Mark Eashoo
(74) *Attorney, Agent, or Firm*—M. Lawrence Oliverio; Kudirka & Jpbse, LLP

(57) ABSTRACT

A method for producing a plastic film having improved characteristics, which consists in nebulizing on the faces, in the region downstream of the extruder, at least one "active substance" or a mixture of "active substances", utilizing the various states of aggregation of the product generated by the temperature distribution. These substances modify the structure of the film, in particular its surface structure, by bonding and penetrating to a depth which is a function of the temperature, of the material of the film and of the type of substance used.

10 Claims, 5 Drawing Sheets

METHOD FOR PRODUCING A PLASTIC FILM HAVING IMPROVED CHARACTERISTICS, APPARATUS FOR PERFORMING THE METHOD, AND FILM THUS OBTAINED

CROSS-REFERENCE TO RELATED APPLICATIONS

This application claims priority to Italian Application Serial No. PD99A000114 filed May 25, 1999, the disclosure of which is incorporated herein by reference.

BACKGROUND OF THE INVENTION

The present invention relates to a method for producing a plastic film having improved characteristics and to the film thus obtained.

The invention also relates to apparatuses suitable to perform the method.

Plastic films are currently widely used, particularly for packagings which are used mainly to package food products.

Plastic films are in fact capable of combining easy workability and versatility with appreciated characteristics of impermeableness, great strength and low cost.

Recently, the trend in the market of food products is increasingly toward plastic films having improved characteristics in order to protect the contained product in the best possible manner and for a longer time and in order to allow printing on said film.

This is the case, for example, of films to be used to produce packages on which pictures, figures, decorative and ornamental patterns must be reproduced and/or it is necessary to highlight the manufacturer's trademark; such packages require particularly easy adhesion of inks and printing dyes as well as of the adhesives used in packaging processes.

Some packages instead particularly require the characteristic known as "barrier effect", owing to which the product, as long as it remains inside the package, is isolated from the outside by means of materials which reduce the exchange of moisture and gases with the environment and shield against externally-originating UV rays.

In recent times, so-called "smart" packagings have also been devised: they owe their name to the fact that they can be activated after their production (for example by irradiation with UV rays, infrared rays, or electromagnetic fields); by way of said activation, they can acquire new properties, such as for example the ability to react with oxygen.

Packagings of this type are applied in particular for preserving foods, since by absorbing the oxygen that is present inside the package they prevent the proliferation of germs and bacteria and reduce oxidative reactions.

Currently, the production of plastic films having these improved characteristics can be based on the surface application of substances on plastic films at the time of their use, i.e., long after their production.

This method of treating the film entails considerable technical difficulties if particular characteristics are desired.

Once the extrusion process has ended, the plastic film is in fact substantially unsuitable for the surface adhesion of the layer of "active substance" due to lack of wettability or anchoring.

It is therefore necessary to resort to special bonding agents and/or additional treatments which in any case are insufficient to ensure full and firm adhesion of the substance to the film but help to increase the cost of the process for producing this type of film having modified characteristics.

It is also possible to heat the film, so that its surfaces become more suited to the treatment, but the temperature must not be high or close to the softening value in order to avoid problems in terms of irreversible deformations.

Additionally, a film kept in store continues to vary its structural characteristics over time, so that after some time, even if the film is returned to the same temperatures, no identical behaviors are obtained.

SUMMARY OF THE INVENTION

The aim of the present invention is to provide a method for producing a plastic film which has improved characteristics and solves the drawbacks noted above in the current state of the art.

A consequent primary object of the present invention is to provide a method for obtaining a plastic film having improved characteristics with a single process, without having to resort to any subsequent treatment step.

Another object of the present invention is to provide a method for producing a plastic film having improved characteristics in which there is a complete and firm adhesion of the layer of "active substance" which also allows an improvement in the adhesion of layers to be applied subsequently.

Another object of the present invention is to provide a method for obtaining a film which contains substances which can be modified in subsequent steps or contains reinforcing materials.

Another object of the present invention is to provide a method which allows to obtain films having improved characteristics at lower costs than currently available "ordinary" films.

This aim, these objects and others which will become better apparent hereinafter are achieved by a method for producing a plastic film having improved characteristics, characterized in that it provides for at least one step in which, downstream of the extruder that forms the film, in a region in which the film has not yet cooled (ambient temperature) due to the local temperature, an "active substance" is distributed on at least one face of the film and interacts, aggregating with and/or penetrating said film and modifying its characteristics, and by an apparatus for performing the method, characterized in that it comprises means for dispensing active substances which are arranged adjacent to the region in which, due to the local temperature, the film has not yet reached the ambient temperature.

Two temperature-dependent conditions for the film can be identified in the region downstream of the extruder:
  in a first portion, the film has no dimensional stability; this occurs from the temperature $T_e$ (extrusion temperature) until a characteristic temperature $T_s$ (stability temperature) is reached;
  a second portion is determined from the point where the film has reached the temperature $T_s$ to the point where it reaches the ambient temperature $T_a$.

Both portions can be used to distribute an active substance, and the region having the most suitable temperature is chosen according to said substance.

BRIEF DESCRIPTION OF THE DRAWINGS

Further characteristics and advantages of the present invention will become better apparent from the following detailed description of some embodiments thereof, given by way of non-limitative example, particularly as regards the production system; the invention is illustrated by means of the accompanying drawings, wherein.

DESCRIPTION OF THE PREFERRED EMBODIMENTS

Figure 1:
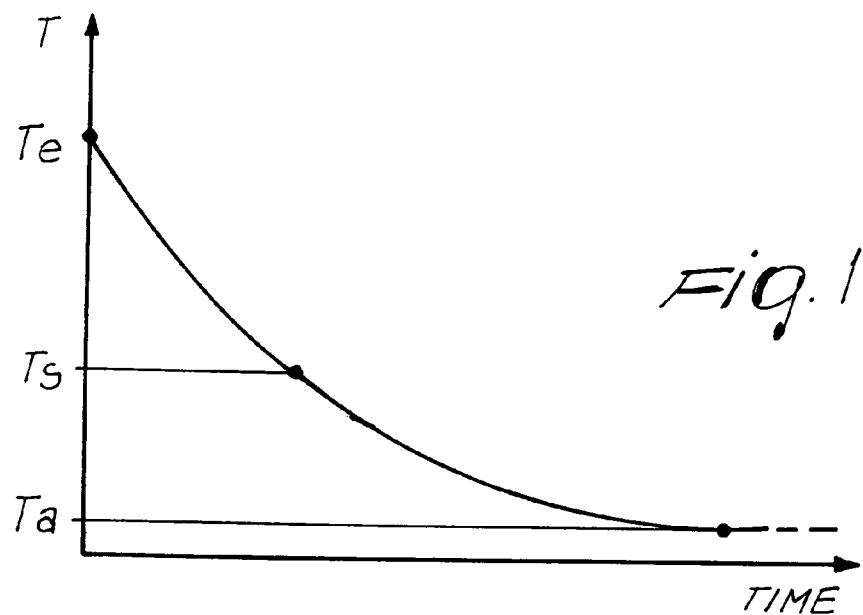
FIG. 1 is a chart which plots the temperature of the film downstream of the extruder.

FIG. 1 is a chart which plots the temperature of the film downstream of the extruder and shows the temperatures $T_e$ (extrusion temperature), $T_s$ (dimensional stability temperature), and $T_a$ (ambient temperature).

Figure 2:
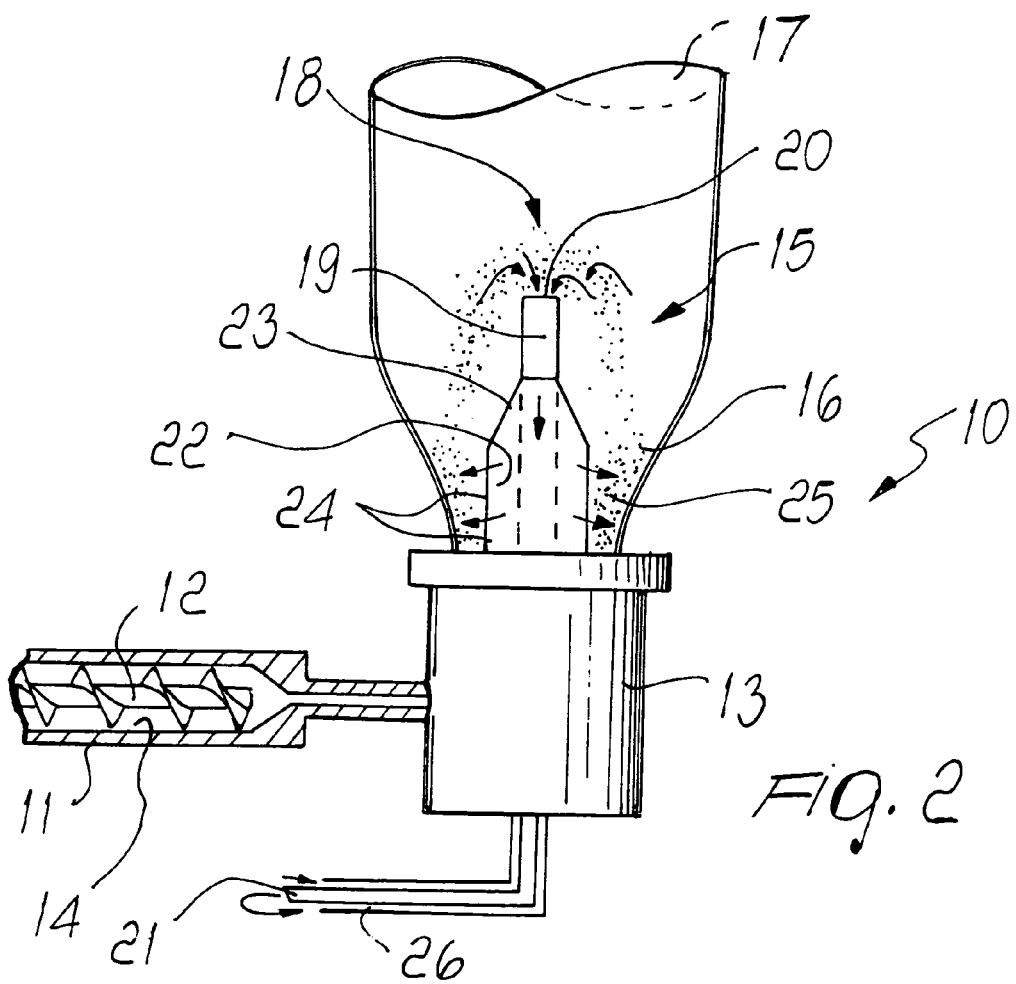
FIG. 2 is a partially sectional side view of an apparatus for performing the method according to the present invention which uses a bubble extruder.
Figure 3:
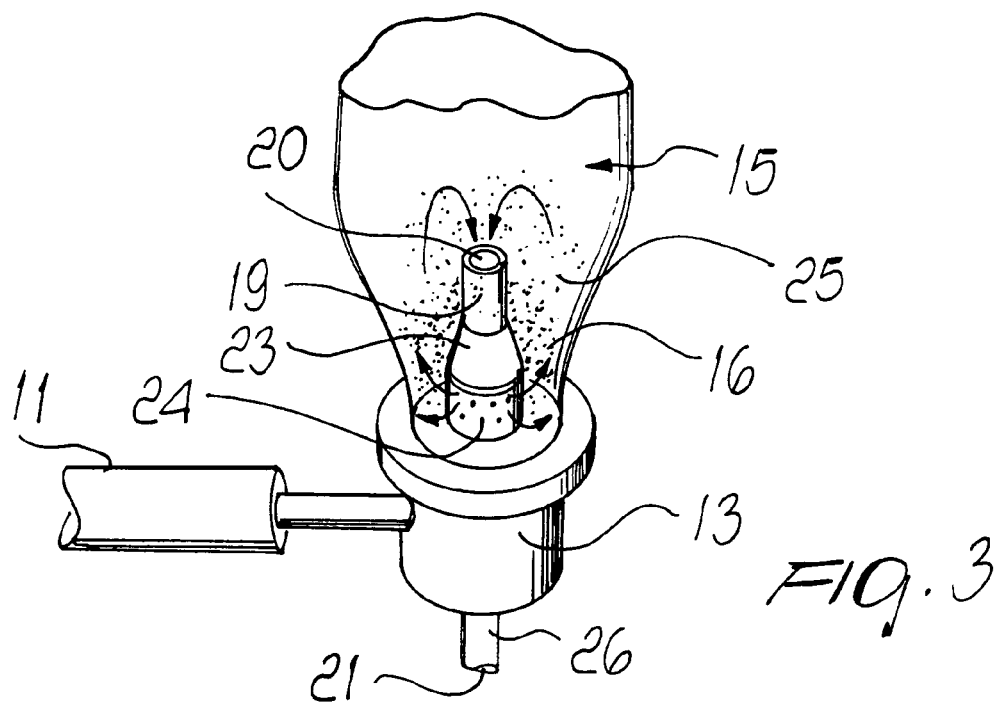
FIG. 3 is a perspective view of the apparatus shown in FIG. 2.

The method for treating a film obtained with a bubble extruder is described with reference to FIGS. 2 and 3; said extruder can in any case be replaced with any other type of extruder, as explained hereinafter.

In this example, an apparatus for producing a plastic film having improved characteristics is generally designated by the reference numeral 10 and comprises an internally hollow cylinder 11 which is arranged longitudinally and is supported by a footing, not shown for the sake of simplicity.

Inside the cylinder 11 there is provided a screw 12 which is coaxial to said cylinder 11 and is moved by an actuator, of the per se known type and not shown for the sake of simplicity, which makes said screw turn about its own axis.

The dimensions of said screw 12 are such as to substantially completely occupy the inside of the cylinder 11.

In particular, said cylinder 11 is fed at one end by introducing plastic material in it and is connected, at its other end, to an extrusion head which is generally designated by the reference numeral 13.

The internal walls 14 of said cylinder 11 are conveniently treated with a protective layer in order to increase their strength.

Said cylinder 11 further has heating means, not shown for the sake of simplicity, which are suitable to supply heat in order to soften the plastic material introduced therein until it reaches the melted state.

Said plastic material is pushed forward by the rotation of the screw 12 until it reaches said extrusion head 13.

Said head, in particular, comprises an extrusion plate with an annular nozzle, not shown in the figures, through which the melted plastics is passed; said plastics, owing to the air introduced therein under slight pressure, assumes the shape of a bubble 15 filled with air which expands the diameter of the tubular portion of film which thus forms.

In the portion of bubble 15 that lies directly proximate to the extrusion head 13 there are walls 16 which are still in the melted state, while the remaining part 17 is cooled, in a per se known manner, by a jet of cold air so that the wall is solidified.

Said walls 16 that are still in the melted state have, in particular, a high molecular mobility and therefore a high capacity to absorb, move and subsequently retain the substances they contact; this occurs, also depending on the "active substances" used, throughout the region where the temperature is such as to keep the film in incompletely stable conditions and also occurs, albeit with a different molecular mobility, until the ambient temperature is reached.

Said extrusion head 13 is provided, in an upward region, with a diffuser, generally designated by the reference numeral 18, which is arranged inside the bubble 15 of film filled with air, so as to be coaxial thereto.

Said diffuser 18 comprises a first duct 19 which, in this case, has a circular cross-section and has, at the opposite part with respect to the extrusion head 13, a first opening 20.

Said opening, whose function will be better explained hereinafter, must be arranged at a convenient distance from the inner face of the walls 16 that are in the melted state.

Said first duct 19 is directly connected to a first tube 21 which protrudes from the extrusion head 13.

Said diffuser 18 further comprises a second duct 22 which is externally coaxial to said first duct 19.

Said second duct 22 is vertically shorter than said first duct 19 and ends with a frustum-shaped end 23.

At the portion that lies proximate to the walls 16 of the bubble 15, said second duct 22 has a plurality of diffuser nozzles 24 through which an "active substance" 25 is nebulized directly onto the inner face of the walls 16.

Said second duct 22 is fed by a second tube 26 which enters the extrusion head 13 and in this case is coaxial to the first tube 21.

Said "active substance" 25 is therefore nebulized directly onto the inner face of the walls 16, which are still in the melted state so that, by way of their high absorption capacity, it deposits itself on their hot surface and interacts with the thin outermost layer (which is a few nanometers thick), and remains firmly bonded, or penetrates, thus modifying the surface of the film which, once duly cooled and solidified, has improved characteristics.

In this manner, the film thus obtained is constituted by a plastic film on one face of which a thin layer of said "active substance" 25 is firmly bonded so as to form in practice a single body.

Air and the excess of "active substance" 25 that has not deposited on the walls 16 are drawn through said first opening 20.

In this manner, it is possible to recover through said first tube 21 the "active substance" 25 that has not been used, by recycling it in a subsequent step.

In particular, the film obtained with said apparatus 10 ensures a considerable improvement in the adhesion of inks, or other chemical products, whenever at least one of the following components is used as "active substance" 25:
  silanes;
  titanium acetyl acetonate;
  polyethylene imine;
  ionomeric dispersions;
  shellac;
  mono- and dicarboxylic acids (acrylic acid, stearic acid) copolyester dispersions;
  dispersions of ethylene-acrylic acid (EAA) or methacrylic acid copolymer;
  UV cross-linking acrylic resins;
  acrylic (styrene-acrylic) dispersions;

acrylic resins;
acrylamide;
styrene-butadiene dispersions;
polar monomers.

As an alternative, the resulting flexible film has high "barrier effect" properties against the passage of gas, water vapor, oxygen or UV rays whenever at least one of the following components is used as "active substance" 25:
dispersions of EVOH or PVOH;
polyvinyl acetate (PVA) dispersions;
dispersions of ethylene-acrylic acid (EAA) or methacrylic acid copolymer;
UV cross-linking acrylic resins;
acrylic (styrene acrylic) dispersions;
styrene-butadiene dispersions.

The film can also be treated with stabilizers of the silane group in order to achieve stabilization against external agents such as heat, solvents, gases, et cetera. It is also possible to "shoot" onto the surface of the film microcapsules which are resistant to the local temperature of the film in the region where they make contact and contain substances of various kinds.

It is also possible to use reinforcing fibers, such as glass fibers, carbon fibers, et cetera, in order to improve the mechanical characteristics.

These microcapsules preserve the active substances contained therein until one decides to activate them by means of a source of energy which can be heat, radiation, a microwave treatment, et cetera.

If one wishes to obtain a flexible film which has improved flow and slipperiness properties than currently available "ordinary" films, it is sufficient to use amides as "active substance" 25.

Another possibility is ensured whenever one wishes to obtain a flexible film which has characteristics that assist cross-linking by using zinc stearate and/or caprolactam as "active substance" 25.

In order to produce a film to be used for "smart" packages it is sufficient to use as "active substances" 25 substances which react in the presence of oxygen, such as for example oxidizing salts.

The nebulization of the "active substance" 25 can occur by using a solvent (water) which acts as a vehicle and is aspirated by the first duct 19 after evaporating due to the heat.

In other fully equivalent cases, the "active substance" 25 can be dried, cross-linked, fixed or cured onto the inner face of the walls 16 by resorting for example to irradiation with UV rays, infrared rays, microwaves, et cetera.

It is also important to note that it is possible to deposit onto the walls 16 a plurality of "active substances" which are combined in a mixture or superimposed in various separate layers.

Figure 4:
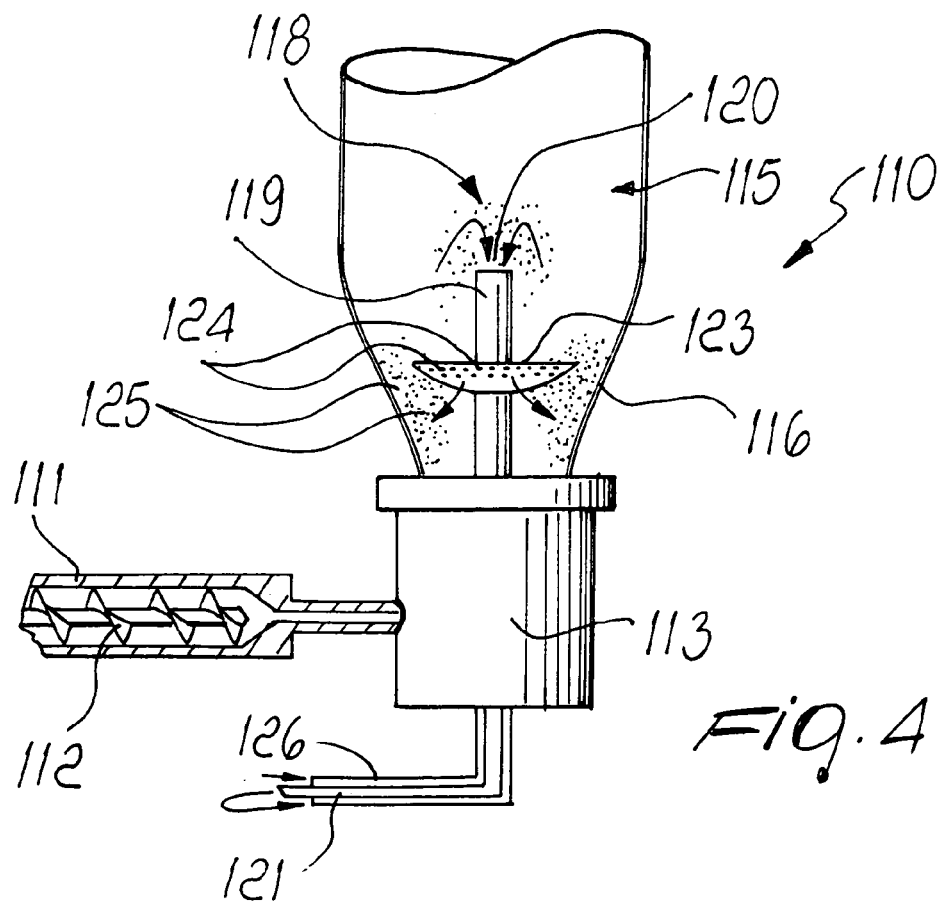
FIG. 4 is a partially sectional side view of a second embodiment of the apparatus for performing the method according to the invention.
Figure 5:
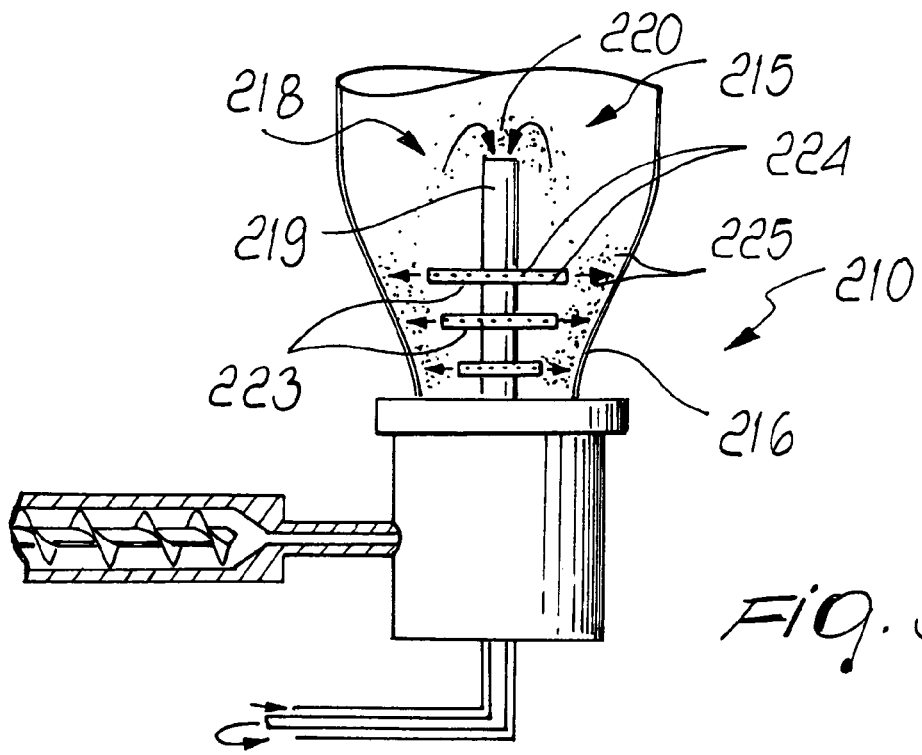
FIG. 5 is a partially sectional side view of a third embodiment of the apparatus according to the invention.
Figure 6:
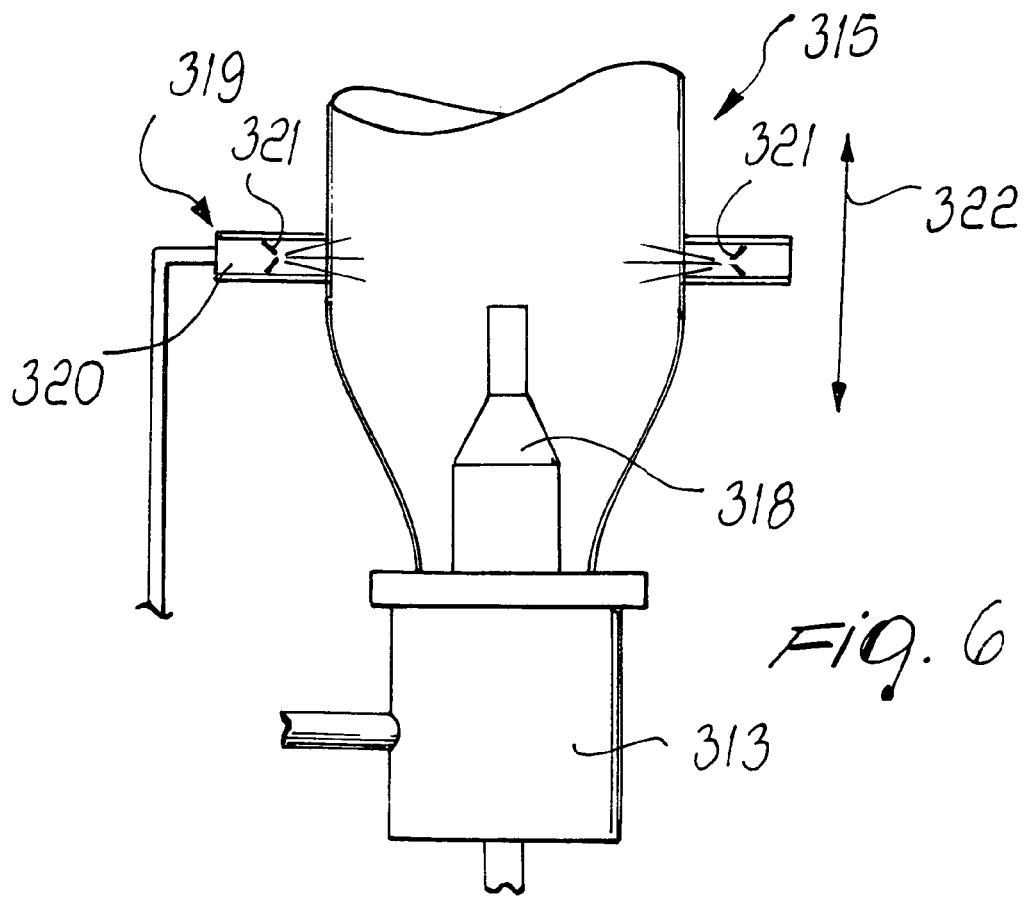
FIG. 6 is a schematic side view of a fourth embodiment of the apparatus which performs the method.

With particular reference to FIG. 4, a second embodiment of the apparatus for performing the method according to the invention is designated by the reference numeral 110 and comprises, like the preceding configuration, an internally hollow cylinder 111 inside which a screw 112 turns which occupies substantially completely the inside of said cylinder 111.

Said cylinder 111 is connected to an extrusion head 113 into which the melted plastics is introduced by means of the pressure that it receives from the rotation of the screw 112, and an air-filled bubble 115 of film exits from said head.

Above the extrusion head 113 there is provided a diffuser 118 which is arranged so that it lies inside the bubble 115 and comprises a first duct 119 which has a circular cross-section and is associated, at a portion which is proximate to the walls 116, which are in a melted state, with a second duct, not shown in the figures, which comprises a hemispherical body 123 which has a plurality of diffusion nozzles 124.

Said nozzles are directed toward the internal face of the walls 116 in the melted state, and an "active substance" 125 is nebulized through them.

Said first duct 119 ends, at a convenient distance from the walls 116 of the bubble 115, with a first opening 120 through which air and the "active substance" 125 that has not deposited onto the walls 116 are aspirated.

Said first duct 119 is connected to a first tube 121, while said hemispherical body 123 is fed with said "active substance" 125 through a second tube 126 which is coaxial to said first tube 121.

With reference to FIG. 5, a third embodiment of the apparatus for performing the method is now designated by the reference numeral 210 and is fully identical to the preceding ones, except for the diffuser, which in this case is generally designated by the reference numeral 218.

Said diffuser 218, which is again coaxial to the bubble 215 of extruded film and is arranged inside it, comprises a first duct 219 which has a circular cross-section and is associated, at a portion which lies proximate to the walls 216, which are in the melted state, with a second duct, not shown, which comprises a plurality of disk-like bodies 223, each of which is provided with a plurality of diffusion nozzles 224 along its perimeter.

In particular, the dimensions of said disk-like bodies 223 are such as to follow the shape of said walls 216, so that said diffusion nozzles 224 are all substantially at the same distance from the inner face of said walls 216.

An "active substance" 225 is nebulized through said nozzles 224 and can thus deposit directly onto the walls 216, which are still in the melted state, so that, owing to their high absorption capacity, said substance deposits onto their hot surface and interacts with the thin outermost layer (a few nanometers thick), remaining firmly bonded so as to constitute the modified surface of the resulting film or so as to act as a promoter for a different substance distributed in a subsequent step.

FIG. 6 schematically illustrates an apparatus which, in a bubble extruder, allows to treat not only the inner face of the bubble but also the outer face.

In this case, an extruder 313 again forms the bubble 315 and on the inside of said bubble there is provided a device 318 for nebulizing the active substance inside the bubble.

On the outside there is provided an additional device, now designated by the reference numeral 319, which is constituted by a ring 320 provided with a plurality of spray nozzles 321 which distribute an active substance, which can also be different from the one distributed by the internal device 318, onto the outer face of the bubble 315:

This ring, which can also be a sum of rings fed with different active substances, can also be provided so that it can move in the direction of the arrow 322, which shows the movement it performs in order to follow the movement of the bubble 315.

In this manner it is also possible to localize non-uniform surface treatments on the entire surface of the bubble.

All the devices inside and outside the bubble can be movable and also their geometry can be varied on command so that they follow the dimensional variation of the bubble according to the distance from the extruder.

The illustrated example is referred to an extruder of the bubble type, but as already mentioned, the method can also be conveniently used with extruders of the normal type (CAST) and the treatment can again be performed on both faces of the film.

Figure 7:
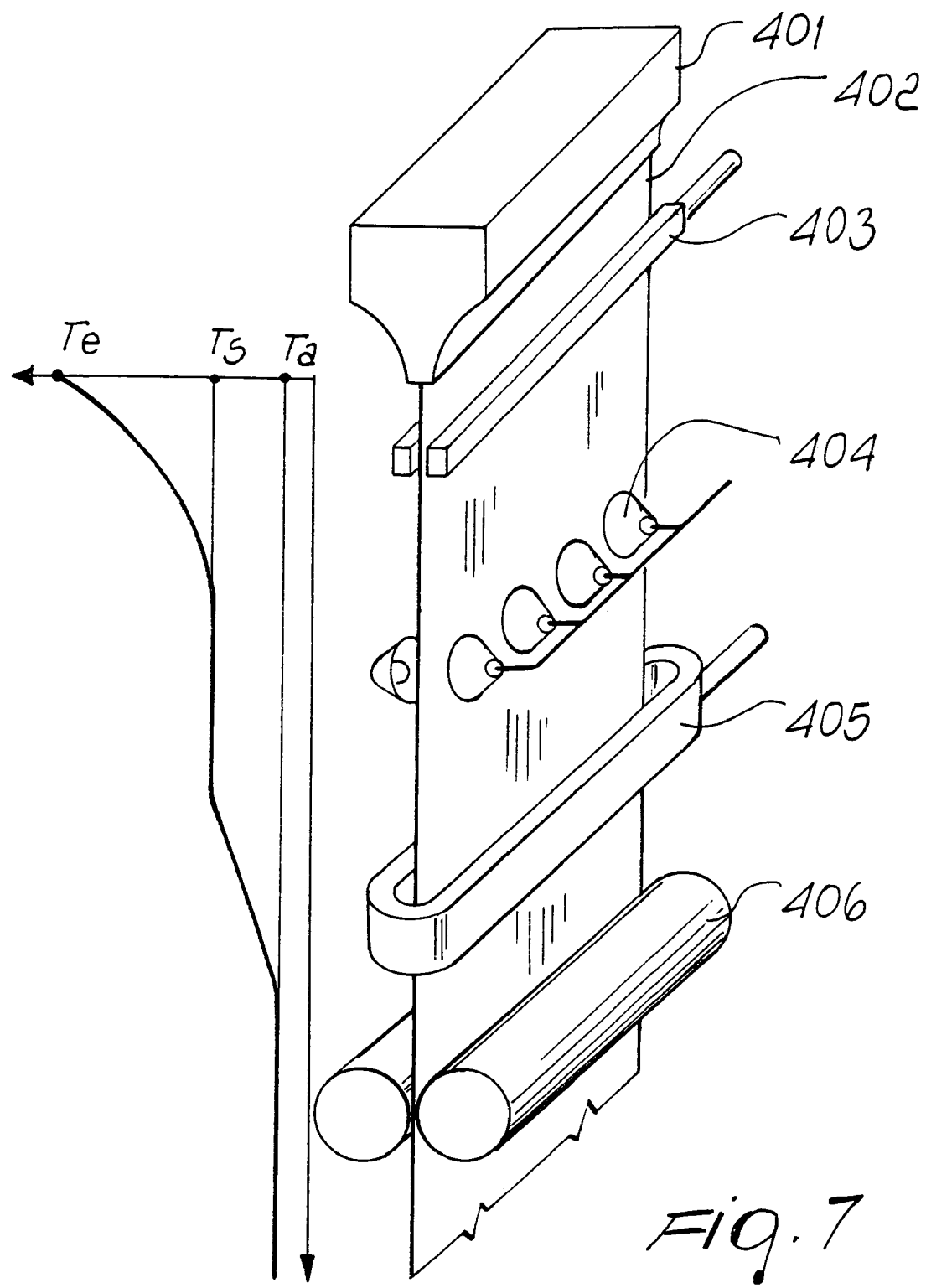
FIG. 7 is a schematic view of a continuous extruder of the CAST type, with the film treatment means and, to the side, the chart which plots the temperature on said film.

FIG. 7 schematically illustrates an extruder of the linear type (CAST) whose final part is designated by the reference numeral 401.

Said extruder forms a film 402 which can be treated on both faces by means of dispensers of active substances 403, in this case of the linear type.

Normally, in an extruder of the CAST type the temperature drops rapidly as the distance from said extruder increases, and therefore the working spaces and times may be short.

In order to obviate this problem it is possible to provide heating systems, designated by the reference numeral 404, which allow to extend the regions in which it is possible to perform treatments with active substances because the temperature of the film allows to do so.

Annular configurations of the type designated by the reference numeral 405 are also possible; they allow to treat with active substances both faces of the film, which passes through conventional calenders 406 after the treatment.

To the side of the figure there is a chart which schematically plots the temperatures and shows how, by way of example, the stabilization temperature can be maintained for a much longer time just by way of the auxiliary heating.

Figure 8:
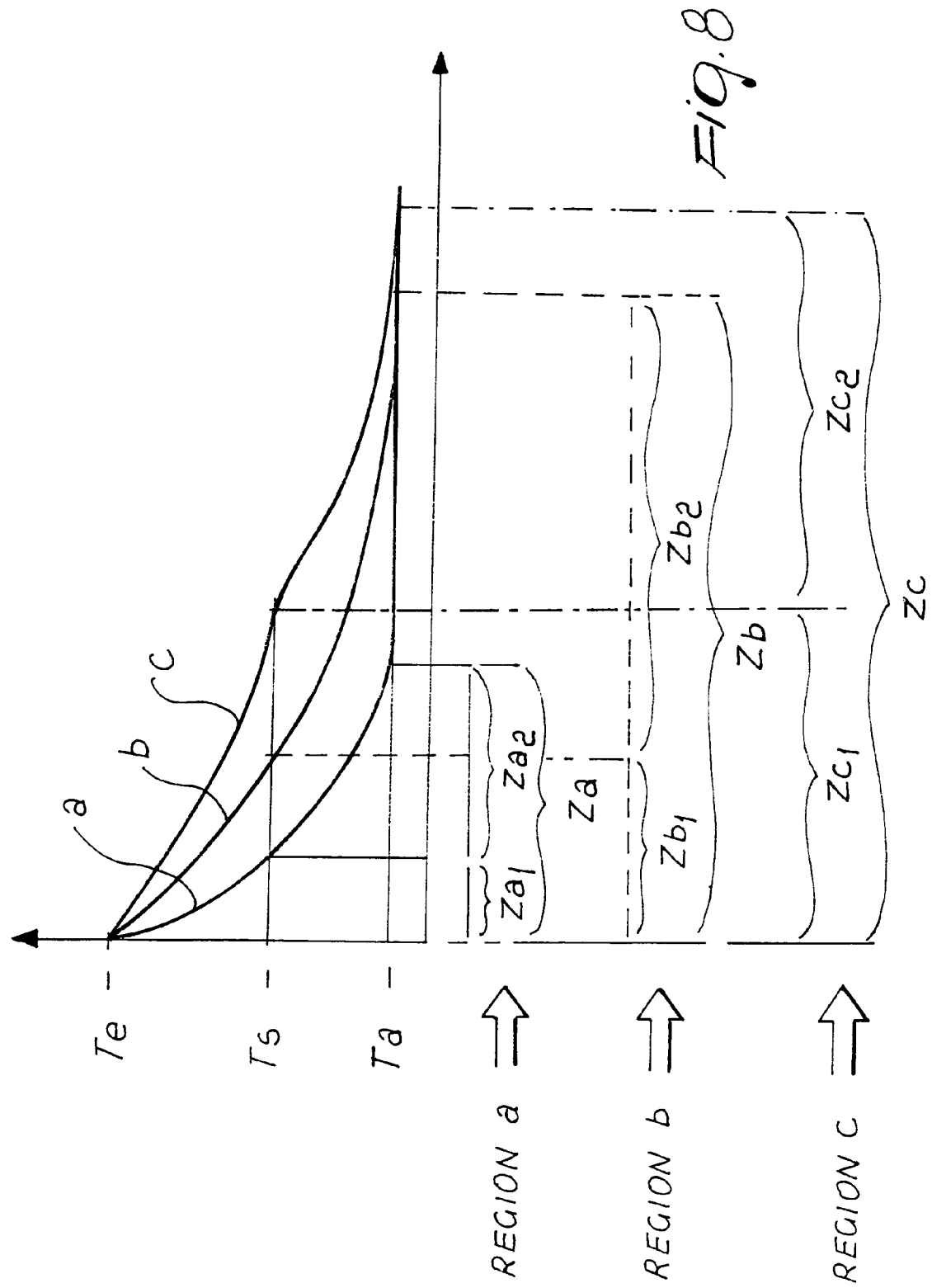
FIG. 8 plots three typical behaviors of the temperature of the film downstream of the extruder and down to ambient temperature.

This situation is shown more clearly in FIG. 8 which plots, by way of example, three types of cooling curve that can be obtained.

The curve designated by "a" plots the normal cooling of the film as it leaves the extruder. In this case, $Z_{a1}$ designates the region where the temperature is above the film stabilization temperature and the region $Z_{a2}$ designates the region where the temperature remains between the stabilization value and the ambient value.

Globally, these two regions are designated by $Z_a$, which represents the useful region for introducing active substances in the film.

The curve "b" represents a modified cooling curve, in which the film is heated uniformly over all the region where the temperature varies from the extrusion temperature to the ambient temperature.

As shown, it is possible to extend the regions, now designated by $Z_{b1}$, $Z_{b2}$ and globally designated by $Z_b$, in which processes can be performed.

The curve "c" shows a similar situation, in which the film is heated in a first region $Z_{c1}$, which in this case is the one where the temperature varies from the extrusion temperature to the stabilization temperature.

By intervening in this manner it is possible to modify the regions, now designated by the reference numeral $Z_{c1}$, $Z_{c2}$ and generally designated by $Z_c$, where it is possible to intervene by treating the surface of the film.

It is also possible to act in a plurality of successive steps, bringing different substances into contact with regions of the film at different temperatures.

In this manner it is possible to achieve the combination of a plurality of products which can thus lead to mutually different and combined characteristics.

It is of course possible to place different substances in contact on the two faces of the film in order to obtain a film which allows, for example, to produce a package having different characteristics on the inside and on the outside of said package.

For example, it is possible to treat the face of the film that will contact the contents of the package so that it acts particularly as a barrier, while it is possible to treat the outer part so that it can be printed more easily with inks of various kinds.

In addition to treatment with active substances which combine immediately or are retained by the surface of the film, it is possible to send onto the film microcapsules which contain active substances and in which the shell withstands the temperature of the film and prevents the substances from being released immediately.

These substances can be subsequently activated by opening the enclosure of the microcapsule by means of an appropriate form of energy, which can be of the optical type, such as ultraviolet rays, or of the electromagnetic type, such as microwaves, et cetera.

For particular films it is possible to introduce in the film microfibers, for example glass or carbon fibers, with the aim of modifying the mechanical characteristics of said film.

In practice it has been observed that the present invention broadly achieves the aim and all the objects.

A considerable advantage is certainly achieved in view of the fact that the present invention provides a method for obtaining flexible plastic films having improved characteristics by resorting to a single process without having to perform any additional process step.

Another important advantage has been achieved by virtue of the fact that a method for obtaining a flexible plastic film having improved characteristics has been devised in which complete and firm adhesion of the layer of "active substance" is observed.

It certainly should also be noted that the described method allows to obtain films having improved characteristics at lower costs than currently available "ordinary" films.

All the details may furthermore be replaced with other technically equivalent elements.

The materials used, so long as they are compatible with the contingent use, as well as the dimensions, may be any according to requirements.

The disclosures in Italian Patent Application No. PD99A000114 from which this application claims priority are incorporated herein by reference.

What is claimed is:

1. A method for producing a plastic film having improved characteristics, comprising forming the plastic film by extrusion from an extruder nozzle, the film emerging from the nozzle in a melted state, distributing at least one active substance on at least one face of the film, in a region of the film having a temperature higher than the ambient temperature such that the active substances penetrate into and are retained within the film to form a single body of film, cooling the film downstream of the extruder nozzle to a solidified state at ambient temperature wherein the one or more substances are permanently incorporated in the body of the film in the solidified state to modify selected characteristics of the film wherein said active substance provides said film with a "barrier effect" characteristic against the absorption of aromas, water vapor or UV rays.

2. The method according to claim 1, wherein said active substances are selected from the group consisting of:
   dispersions of EVOH or PVOH:
   polyvinyl acetate (PVAC) dispersions;
   dispersions of ethylene-acrylic acid (EAA) or methacrylic acid copolymer;
   UV cross-linking acrylic resins;
   acrylic (styrene acrylic) disperse systems;
   styrene-butadiene dispersions.

3. A method for producing a plastic film having improved characteristics, comprising forming the plastic film by extrusion from an extruder nozzle, the film emerging from the nozzle in a melted state, distributing at least one active substance on at least one face of the film, in a region of the film having a temperature higher than the ambient temperature such that the active substances penetrate into and are retained within the film to form a single body of film, cooling the film downstream of the extruder nozzle to a solidified state at ambient temperature wherein the one or more substances are permanently incorporated in the body of the film in the solidified state to modify selected characteristics of the film, wherein said active substance gives said film characteristics of high flow and surface slipperiness.

4. The method according to claim 3, wherein said active substance is an amide.

5. A method for producing a plastic film having improved characteristics, comprising forming the plastic film by extrusion from an extruder nozzle, the film emerging from the nozzle in a melted state, distributing at least one active substance on at least one face of the film, in a region of the film having a temperature higher than the ambient temperature such that the active substances penetrate into and are retained within the film to form a single body of film, cooling the film downstream of the extruder nozzle to a solidified state at ambient temperature wherein the one or more substances are permanently incorporated in the body of the film in the solidified state to modify selected characteristics of the film, wherein said active substances makes said film a crosslinking promoter.

6. The method according to claim 5, wherein said active substance is zinc stearate and/or caprolactam.

7. A method for producing a plastic film having improved characteristics, comprising forming the plastic film by extrusion from an extruder nozzle, the film emerging from the nozzle in a melted state, distributing at least one active substance on at least one face of the film, in a region of the film having a temperature higher than the ambient temperature such that the active substances penetrate into and are retained within the film to form a single body of film, cooling the film downstream of the extruder nozzle to a solidified state at ambient temperature wherein the one or more substances are permanently incorporated in the body of the film in the solidified state to modify selected characteristics of the film, wherein said active substance comprises a material that reacts when subsequently exposed to a selected treatment.

8. The method according to claim 7, wherein said active substance is an oxidizing salt.

9. A method for producing a plastic film having improved characteristics, comprising forming the plastic film by extrusion from an extruder nozzle, the film emerging from the nozzle in a melted state, distributing at least one active substance on at least one face of the film, in a region of the film having a temperature higher than the ambient temperature such that the active substances penetrate into and are retained within the film to form a single body of film, cooling the film downstream of the extruder nozzle to a solidified state at ambient temperature wherein the one or more substances are permanently incorporated in the body of the film in the solidified state to modify selected characteristics of the film, wherein identical or different active substances are nebulized on both faces of the film.

10. A method for producing a plastic film having improved characteristics, comprising forming the plastic film by extrusion from an extruder nozzle, the film emerging from the nozzle in a melted state, distributing at least one active substance on at least one face of the film, in a region of the film having a temperature higher than the ambient temperature such that the active substances penetrate into and are retained within the film to form a single body of film, cooling the film downstream of the extruder nozzle to a solidified state at ambient temperature wherein the one or more substances are permanently incorporated in the body of the film in the solidified state to modify selected characteristics of the film, wherein said active substance is constituted by microcapsules or micropearls which contain substances which are suitable to combine and/or interact with the film and whose shell withstands the temperatures of the region of the film in which thy are introduced and can subsequently be activated in order to release the contents due to the application of energy obtained for example with ultraviolet rays, ultrasound or electromagnetic radiation.

* * * * *